United States Patent [19]
Schroth et al.

[11] Patent Number: 5,340,046
[45] Date of Patent: Aug. 23, 1994

[54] ENERGY CONVERTER FOR A SAFETY BELT

[75] Inventors: Karl-Jürgen Schroth, Soest; Rolf Jeche, Arnsberg; Stefan Meier-Arndt, Kamen, all of Fed. Rep. of Germany

[73] Assignee: Carl F. Schroth GmbH

[21] Appl. No.: 962,760

[22] Filed: Oct. 19, 1992

[30] Foreign Application Priority Data

Oct. 24, 1991 [DE] Fed. Rep. of Germany ....... 4135111

[51] Int. Cl.⁵ ............................................. B65H 75/48
[52] U.S. Cl. .................... 242/407; 242/598; 242/599
[58] Field of Search ............ 242/55, 107.2, 107.3, 242/107.4 R, 107.4 A; 280/805, 806, 807, 808; 188/65.1, 65.2, 65.3, 65.4, 65.5

[56] References Cited
U.S. PATENT DOCUMENTS

| | | | |
|---|---|---|---|
| 3,741,494 | 6/1973 | Fiala | 242/207.4 R |
| 3,857,528 | 12/1974 | Fiala | 242/107.4 R |
| 3,881,667 | 5/1975 | Tandetzke | 242/107.4 A |
| 3,927,846 | 12/1975 | Meissner | 242/107.4 R |
| 3,952,967 | 4/1976 | Barile et al. | 242/107.4 R |
| 3,961,761 | 6/1976 | Wiesböck | 242/107.4 A |
| 3,970,265 | 7/1976 | Köpke et al. | 242/107.4 A |
| 4,256,273 | 3/1981 | Burleigh | 242/107.4 R |
| 4,322,046 | 3/1982 | Tanaka et al. | 242/107.4 A |
| 4,323,205 | 4/1982 | Tsuge et al. | 242/107.4 A |
| 4,394,992 | 7/1983 | Föhl | 242/85 |

Primary Examiner—Daniel P. Stodola
Assistant Examiner—John P. Darling
Attorney, Agent, or Firm—Feiereisen & Kueffner

[57] ABSTRACT

An energy converter comprises a sleeve with a sleeve channel. A longitudinal groove is configured in the wall of the sleeve channel. A shank of a bolt is introduced into the sleeve channel. An L-shaped deformation member having an arresting leg is introduced into a lateral bore of the bolt shank, wherein then the sleeve leg comes to rest in the longitudinal groove of the sleeve and at the outer surface of the bolt shank. The sleeve and the bolt are thus secured against rotation. The bolt has a hexagonal bolt head, which can be positionally fixed in a matchingly configured aperture in the cheek of the belt fitting. If a predetermined force F acts upon the belt band, the sleeve and the bolt turn relative to one another and the deformation member pulls out of the longitudinal groove while rolling around the bolt shank.

16 Claims, 4 Drawing Sheets

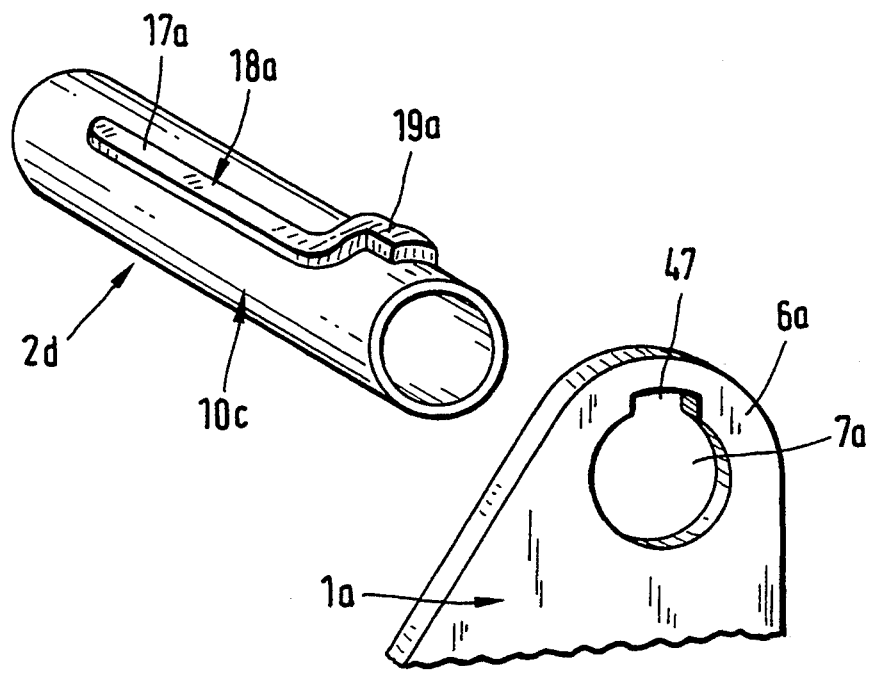
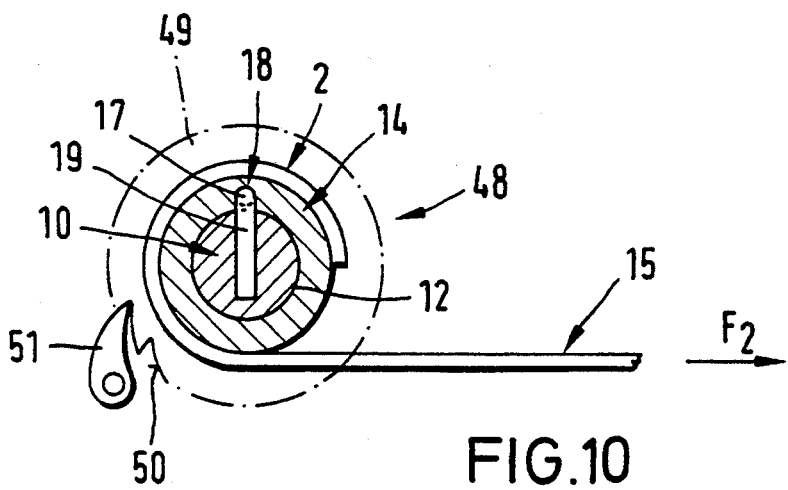
FIG. 9
FIG. 10

ENERGY CONVERTER FOR A SAFETY BELT

BACKGROUND OF THE INVENTION

1. Field of the Invention

The present invention relates to an energy converter for a safety belt.

2. Description of the Related Art

Energy converters are known from the DE-OS 23 44 878 wherein the deformation member includes a bushing which embraces a screw bolt at a spacing and which is pushed by a nut, axially displaceable upon the screw bolt, onto a cone which constitutes a component of the screw bolt. The nut is disposed inside a sleeve and is connected with same so as to be capable of transmitting a torque. The belt band or strip of the safety belt is attached to the circumference of the sleeve. The screw bolt is non-rotatably supported by its polyhedral head in the cheek of a U-shaped belt fitting. An exposed threaded segment of the screw bolt penetrates through a parallel cheek of the belt fitting.

A drawback of this type of construction is that the energy conversion cannot be performed on a uniformly high level. Peak loads of the user of the belt are unavoidable. The reasons for this result from the fact that the small area contact of the nut is displaceable upon the screw bolt with only one end segment of the sleeve, and the threaded connection between the nut and the screw bolt, as well as the bushing-like deformation member, is displaceable by the nut in longitudinal direction of the screw bolt which member must be pushed over the cone on the threaded bolt.

Another drawback is that several unrolling revolutions of the belt band, from the sleeve, are necessary for an efficient energy conversion, since with the usual thread pitches, such as they are provided on the screw bolt, there occurs a displacement of the nut across too short a path, in order to convert energy in a defined and reproducible manner. An extension of the belt band, acceptable from the security technology point of view, however, would only at the most, permit two revolutions of the sleeve. If one were to use a thread with an appropriate pitch, it would no longer be procured as a standard part. The advantage connected therewith would then be eliminated.

In addition, there results such an unfavorable force parallelogram at the screw thread flanks, between the screw bolt and the nut, that the turning of the sleeve is only possible when using a very soft deformation or resilient member. Any change of friction in the thread thus immediately changes the load-strain characteristic at the belt band. With mass production, there results therefrom a special drawback, since a constant effectiveness can only be assured with a great expenditure of mechanical apparatus.

SUMMARY OF THE INVENTION

It is the primary object of the present invention to provide an energy converter for a safety belt avoids peak loads upon the body of a belt user during the restraining phase during the course of an accident by permitting the deformation member to plastically deform at a predetermined constant force level.

The energy converter for a safety belt according to the present invention includes a sleeve which is at least partially wrapped around by a belt band in an entrainment sense, and which is penetrated by at least one bolt which is supported so as to be non-rotatable in a stationarily attached belt fitting. A deformation member is clamped between the bolt and the sleeve. The deformation member is a two-leg wire section, wherein a sleeve leg is embedded in a positively and slide-locking manner. The sleeve leg is adapted to the sleeve and extends parallel to the axis of the bolt, which is supported slidably in the sleeve, and along the surface of the bolt shank which contact the surface of the bolt shaft into an inner longitudinal groove of the sleeve which is, in turn, adapted to the cross-section of the sleeve leg. An arresting leg of the deformation member is angled-off the sleeve leg and is fixed adjacent the end face of the sleeve in the bolt.

In the readiness state of the energy converter of the present invention, the displacement of the bolt, relative to the sleeve, is impossible without exerting considerable force. All parts are disposed next to one another in a positively locking manner. Thus, the overall system is explicitly at rest.

If however, there arises a force at the belt which is predetermined by the dimensioning or the selected bending stiffness of the deformation member, then the sleeve attempts to turn with respect to the bolt. If herein, a preset force is exceeded, then the sleeve leg is pulled in a longitudinal direction out of the longitudinal groove of the sleeve, so that the length of the sleeve leg is permanently shortened. Simultaneously, the length of the arresting leg increases, which however, now winds itself around the bolt shank on the front end of the sleeve channel as a function of the relative angle of turn between the sleeve and the bolt. This wrap-around process results across a complete revolution of the sleeve relative to the bolt in a constant load-strain curve or characteristic. In this manner, a peak load on the body of the belt user is explicitly prevented. Herein, the force level may be accurately predetermined by the dimensioning of the deformation member, by its bending stiffness, by the outer diameter of the bolt shank and by the wrap-around diameter of the belt on the sleeve. The material of the deformation member may also be selected so that the deformation member has, to the extent possible, no excess dynamic force compared with the static bending.

Such an energy converter requires only a small installation space. In addition, it may be easily used for retrofits of safety belts for such seats, which were not provided with safety installations such as energy converters. A very special advantage is realized in that the energy converter of the present invention completely satisfies the lightweight construction requirements dictated in aircraft construction. Therefore, it may be preferably used in flight attendant seats, the foldable seating surfaces of which, generally protrude into the escape passages and must not be permitted to impair a rapid evacuation of an aircraft after an accident. The folding function must be completely preserved at all times.

An advantageous embodiment of the present invention provides for two deformation members, having sleeve legs offset through 180° to each other, and which are provided on the circumference of the bolt and are fixed in position with their arresting legs adjacent the end faces of the sleeve. By utilizing two deformation members, between the sleeve and the bolt, the force level may be doubled.

In an embodiment of the present invention, wherein the arresting leg of the deformation member has a round cross section, the arresting leg is fitted into a radial lateral bore of the bolt shank. In this embodiment, the deformation member, which consists of a simple wire segment, has a round or circular cross-section. Further, it is bent into an approximate L-shape, wherein the short arresting leg is introduced into a radial bore in the bolt shank. Preferably, the radial bore does not extend through the entire diameter of the bolt shank. In this manner, the surface of the bolt shank, which is located opposite to the bore mouth, remains closed. The radial lateral bore of the bolt shank for receiving the arresting leg is preferably disposed in such proximity to the end face of the sleeve that, after rotation of the sleeve through nearly 360° relative to the bolt shank, the sleeve leg, emerging from the longitudinal groove, strikes against the arresting leg which enters into the lateral bore and thus, the further rotation of the sleeve, relative to the bolt shank, is prevented.

The turning force of the sleeve relative to the bolt can be adjusted in a targeted manner by the use of an embodiment of the present invention wherein the transition of the longitudinal groove into the regions of the end faces of the sleeve, adjoining the mouth of the sleeve channel, is rounded to match the cross-section of the deformation member. No sharp edges exist which would impair the deformation behavior of the deformation member.

In another embodiment of the present invention, the sleeve has a recess in the end face in the plane of the arresting leg which extends laterally to the axis of the bolt. The front end recess of this embodiment has the advantage that the arresting leg of the deformation member can be completely embedded therein. In this manner, the front face of the sleeve becomes functionally a sliding surface if the sleeve is disposed thereinbetween, for instance, two parallel cheeks of a basically U-shaped belt fitting. This type of construction is particularly advantageous if the energy converter has only one deformation member.

In another advantageous embodiment of the present invention, the bolt consists of two longitudinal segments, which are non-rotationally pinned together, wherein an arresting leg of a deformation member is fixed in position at each longitudinal segment. Herein, the installation of the energy converter is simplified particularly if two deformation members are utilized for increasing the force level.

The length segments are herein inserted from the end faces of the sleeve into the sleeve channel until a lug on the end face of one longitudinal segment engages, in a positively locking manner, into an end face recess of the other longitudinal segment. A non-rotatable connection of the two longitudinal segments can be achieved by bonding. Another possibility consists in driving a dowel pin transversely through the appropriate apertures and into the ends of the two longitudinal segments which are in a mortised engagement with one another. In this case, it is necessary to also provide a lateral bore in the sleeve through which such a dowel pin may be driven for connecting the two longitudinal segments.

Further, it is also desirable to equip the longitudinal segments with polyhedral heads, which are supported in a non-rotating manner in recesses in two cheeks of a belt fitting. The deformation member extends across the entire length of the sleeve or only across part of the length. A deformation member is assigned to each longitudinal segment. The deformation members are located so as to be offset circumferentially through 180° with respect to the common longitudinal axis of the longitudinal segments.

In another embodiment of the present invention, the arresting leg secures the installation position of a closure piece with a positioning disk which is inserted into the end face of the bolt. In this regard, in order to secure the installation position of the energy converter, the locking or closure pieces are on the end faces of the longitudinal segments. These locking pieces penetrate with lugs into recesses in the longitudinal segments. Herein, the lugs have lateral bores into which engage the arresting legs of the deformation members. Thus, the locking pieces and the longitudinal segments, form a single unit. The positioning disks are configured to be so large, that they explicitly prevent an axial displacement of the longitudinal segments relative to the sleeve and to the belt fitting.

In another embodiment of the present invention, the arresting leg of one deformation member, which has a rectangular cross-section, is bent off in an S-shaped manner and is fixed in position in a recess in the belt fitting on the circumference of a receiving bore of the bolt. In this embodiment of the present invention, a deformation member is formed from a flat stock. Herein, the arresting leg is not fixed in the bolt, but rather, in the bolt fitting. For this purpose, a headless bolt is particularly used, which is inserted into a corresponding receiving bore in the cheek of a belt fitting. A recess matching the cross-section of the deformation member is disposed on the circumference of the receiving bore. The arresting leg, which is bent into an S-shape, is inserted into this recess and, subsequently, the bolt is secured in the receiving bore so as to be non-rotatable. This explicitly fixes the position of the deformation member. This embodiment form also permits the use of the two deformation members, which are associated with one another so as to be offset circumferentially through 180°.

In order to reduce the weight of the energy converter, the bolt (single or multipart) has a longitudinal channel. The longitudinal channel may be formed by a bore. Said channel can be continuous, through the bolt, or exist only segment-wise in the bolt.

In yet another embodiment of the present invention, the sleeve has one annular collar on its end face. These features assure, in a targeted manner, a lasting central belt band guidance.

In another embodiment of the present invention, a strip-like driver, around which the belt band is wrapped, is fixed in the annular collar. This embodiment provides for an advantageous arrangement and design for securing a belt band against twisting. Recesses are provided for this purpose in the annular collars, into which the entrainment member or driver is embedded in a positively locking manner. The radial depth of the recesses may be greater than the thickness of the driver, so that the pointedly ending edges of the recesses may be upset in such a manner that the driver is secured in position.

During assembly of an energy converter, the belt band is placed, with its end segment, so as to completely wrap around the sleeve. Herein, the load carrying strand of the belt band extends through the gap between the driver and the surface of the sleeve. The adjoining strands of the belt band are connected with one another in a frictionally locking manner, preferably by sewing, so as to be spaced from the driver. The parallel to one another strands of the belt band extend from the driver approximately across the entire circumference of the sleeve.

If the belt band is subjected to a sufficiently high force in the longitudinal direction, then the sleeve is turned by the force application to the driver, and to such an extent, until the force applied only to one belt band strand has been divided into two similarly high partial forces at both belt band strands in the longitudinal region of the seam. The desired energy conversion may be achieved in this phase and the entire energy converter may satisfy the ultimate load for which it has been designed. Since the definitive attachment of the belt band, to the driver, is not sensible because of weight reasons, it is advantageous to transfer the desired ultimate loads through the belt band directly by means of the sleeve to the bolt connected with the belt fitting. The driver is therefore dimensioned in such a manner, that the force which is applied to the belt band strand, subjected to the tensile force, bends the driver and turns it out of the recesses of the annular collars. The total force is then introduced symmetrically into the sleeve by means of the belt band strands which are sewn to one another.

In yet another embodiment of the present invention, the driver has a convex end face which extends in between the annular collars in a tension or a pull direction of the belt band. The design of the driver, which corresponds to this embodiment, increases the resistance to bending. The opposite end side preferably extends in a straight line.

In still another embodiment of the present invention, the sleeve is flattened beneath the driver so as to permit the creation of a region between the sleeve and the driver, the cross-section of which, is exactly matched to the cross-section of one belt band.

For additional weight reduction of the energy converter, several longitudinal grooves are arranged on the external surface or circumference of the sleeve. This measure provides for the fabrication of the sleeve from a cross-sectional-optimized, extruded, semi-finished product or material.

In another embodiment of the present invention, the bolt is a component of an automatic roll-up or coil-up device and is connected, at least at one end face with a toothed blocking wheel which cooperates with a locking pawl. This embodiment provides for an advantageous embodiment of the invention in coaction with the automatic roll-up device. Normally, in said devices, the belt band is fastened directly to the device axis. In this instance, however, the device axis is constituted by a bolt according to the present invention, which is coupled to a sleeve through at least one deformation member, at which sleeve, a belt band is fastened which also, at least partially, wraps around the sleeve. The bolt and the sleeve are, therefore, secured against rotation. A blocking wheel, with teeth, is disposed on at least one end face of the bolt, into which engages a locking pawl in the case of a blocking process, which prevents a further unreeling of the belt band.

If, in the framework of the present invention, the bolt is prevented from rotating further by the engagement of the locking pawl, into the toothing of the blocking wheel, then the sleeve will attempt to turn with respect to the bolt if a specific tensile force at the belt band is exceeded and winds, herein, the arresting leg of the deformation member, which is lengthened at the expense of the sleeve leg, around the bolt shank.

A considerable advantage of this embodiment is that the roll-up diameter of the belt fan becomes larger and, with the same reel-up and reel-off belt stand length, there occur fewer revolutions with slight change of the belt band coiling. As a result, essentially more constant spring characteristics are achieved which are caused by the spring stress at the belt band. An improved wear in comfort is also achieved.

Accordingly, it is an object of the present invention to provide an energy converter for a safety belt which avoids peak loads upon the body of a belt user during the restraining phase, during the course of an accident, by permitting the deformation member to plastically deform at a predetermined constant force level.

It is another object of the present invention to provide for an energy converter for a safety belt having all of the objectives and advantages described hereinabove.

Other objects and advantages will be made apparent to those skilled in the art upon a review of the description of the preferred embodiment taken in conjunction with the drawings which follow.

BRIEF DESCRIPTION OF THE DRAWINGS

In the drawings:

FIG. 9 illustrates an alternate embodiment in detail, of the energy converter of FIGS. 1 to 8, shown in a perspective view; and FIG. 10 illustrates a fourth embodiment of the energy converter of the present invention, partially in section, and shown in a side view.

DESCRIPTION OF THE PREFERRED EMBODIMENT

Figure 1:
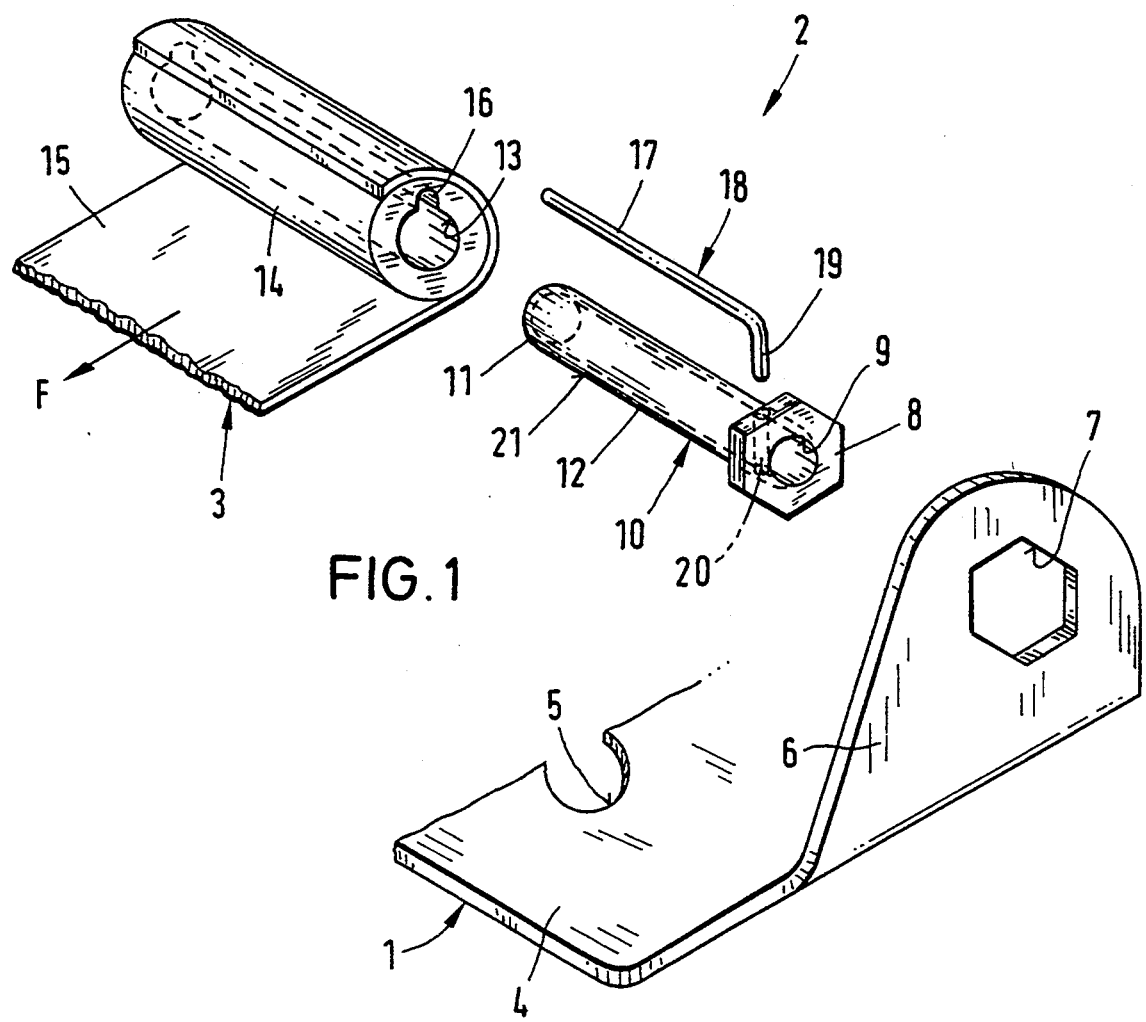
FIG. 1 illustrates an energy converter for a safety belt, which is the subject of the present invention, shown in a magnified view.

FIG. 1 illustrates an energy converter for a safety belt which is the subject of the present invention and which is denoted by the reference numeral 2. In FIG. 1, a belt fitting, which is denoted by the reference numeral 1, provides for the positional attachment of the energy converter 2 of a safety belt 3. The belt fitting 1 consists of a baseplate 4, with at least one attachment bore 5, as well as two parallel cheeks 6, disposed at an angle of 90° with respect to the baseplate 4, of which cheeks only one is illustrated. In the cheek 6, which is illustrated, there is located a hexagonal aperture 7 for the positively locking or embedding of a matchingly designed bolt head 8, of a bolt 10 equipped with a longitudinal bore 9.

In the cheek 6 (not shown), only a bore for the free end 11, of the bolt shank 12, is provided.

A sleeve 14, which is provided with a sleeve channel 13, adapted to the diameter of the bolt shank 12, is displaceable upon the bolt shank 12. The sleeve 14 is dimensioned in such a manner, that it comes to be located with a moving tolerance or play between the two cheeks 6 of the belt bracket 1. The sleeve 14 serves as a means for fastening the belt band 15 of the safety belt 3.

A longitudinal groove 16, for receiving a sleeve leg 17, of an L-shaped deformation member 18, is provided on the circumference of the sleeve channel 13 and extends across the entire length of the sleeve 14. The deformation member 18 consists of a wire segment which is circular in cross-section. The cross-section of the longitudinal groove 16 is shaped accordingly. An arresting leg 19, which is bent off at right angles from the sleeve leg 17, engages in a positively locking manner into a lateral bore 20 of the bolt shank 12 and directly next to the bolt head 8. The lateral bore 20 does not penetrate the bolt shank through its entire diameter. The bolt shank 12 can be provided, at both ends, with a hexagonal bolt head 8. Correspondingly, the second cheek (not shown), on the belt fitting 1, is equipped with an aperture which matches this additional bolt head.

In an assembled state, the sleeve 14 is slid upon the bolt shank 12. The sleeve leg 17 lies in the longitudinal groove 16 of the sleeve 14 and at the outer surface 21 of the bolt shank 12. The arresting leg 19 is then in the lateral bore 20. In this manner, the sleeve 14 and the bolt 10 are connected with one another in a non-rotatable manner. Upon the placing of the bolt head 8, in the aperture 7 of the cheek 6 of the belt fitting 1, the bolt 10 is also secured in a non-rotating manner.

The belt band 15 can be wrapped around the sleeve 14, one or several times, in a readiness position of the energy converter 2.

If a predetermined force F occurs at the belt band 15, which may be caused by the application of a load upon the belt band 15, by the belt user, the sleeve can turn relative to the bolt 10, which remains locally fixed. The sleeve leg 17 is pulled out of the longitudinal groove 16 of the sleeve 14 while shortening, and the arresting leg 19, which is lengthened thereby, is rolled around the bolt shank 12 which corresponds to the relative rotation of the sleeve 14 and the bolt 10 in the region between the end face of the sleeve 14 and the bolt head 8.

This roll-around process results during the course of a complete revolution of the sleeve 14 in a constant forcestrain manner. The force level can herein be accurately predetermined by dimensioning the deformation member 18, through its material-specific bending stiffness, by the diameter of the bolt shank 12 and by the roll-up diameter of the belt band 15 on the sleeve 14.

Figure 2:
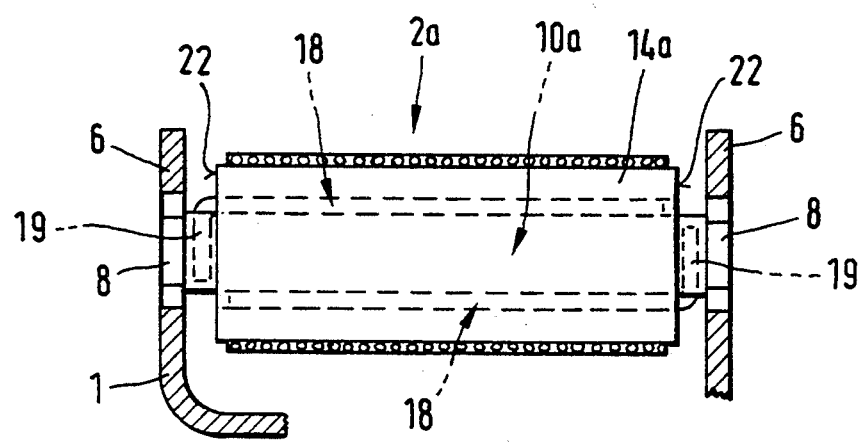
FIG. 2 illustrates an alternate embodiment of the energy converter of the present invention, partially in section, and shown in a front view.

FIG. 2 illustrates an alternate embodiment for an energy converter 2a, of the present invention. In FIG. 2, a bolt 10a, having two hexagonal bolt heads 8 on the ends thereof, is supported and axially fixed in the cheeks 6 of a belt fitting 1. It can be seen that two L-shaped deformation members 18 are clamped between the bolt 10 and a sleeve 14a in a manner similar to that manner illustrated in FIG. 1. The deformation members 18 are disposed so as to be offset from one another through 180° in a circumferential direction. The arresting legs of the deformation member 18 lie, respectively, between the end faces 22 of the sleeve 14a and the cheek 6 of the belt fitting 1.

Figure 3:
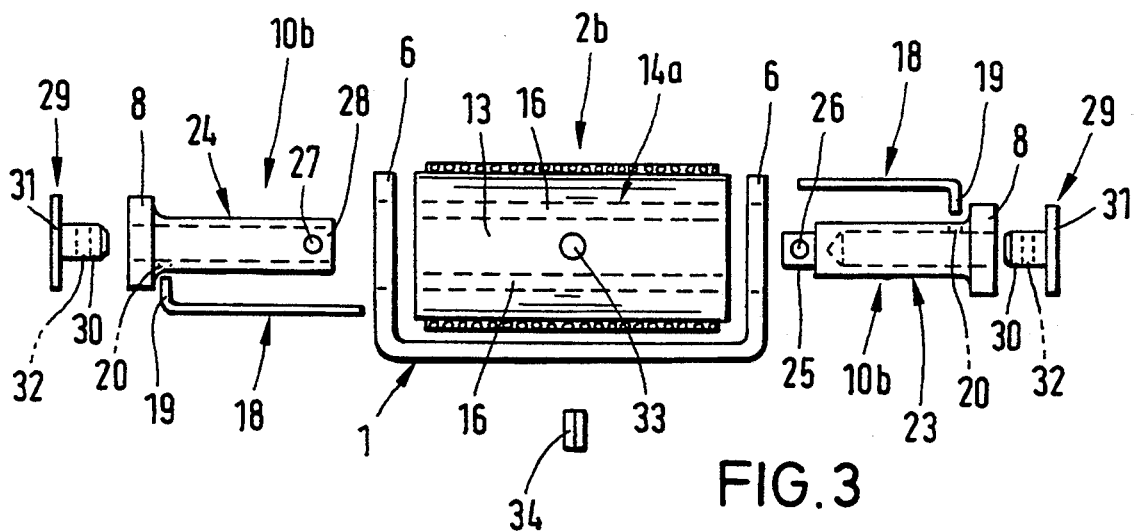
FIG. 3 illustrates a third embodiment of an energy converter, of the present invention, prior to installation, and shown in a front view.

FIG. 3 illustrates another embodiment of an energy converter 2b wherein one sleeve 14a is utilized in a manner described in connection with FIG. 2. In this manner, two longitudinal grooves 16, for each deformation member 18, respectively, are located in the sleeve 14a.

It can be seen that the bolts 10b, which carry the deformation members 18 are subdivided into two longitudinal segments 23, 24. The longitudinal segment 23 has a center peg 25 which has a lateral bore 26 located at its end face. The center peg 25 can be inserted into the end segment 28 of the longitudinal segment 24 which is also provided with a lateral bore 27 which is drilled throughout its entire length. The longitudinal segment 23, which carries the center peg 25 is not drilled through its entire length. Both longitudinal segments 23 and 24 have polyhedral bolt heads 8 at their ends, which face away from one another.

In this embodiment, the L-shaped deformation members 18 may be fixed with the arresting legs 19 in the lateral bores 20 of the longitudinal segments 23, 24.

The longitudinal segments 23, 24 may be inserted, from the end faces of the locking pieces 29, in order to additionally secure their position. The locking pieces 29 consist, respectively, of a lug 30 and a positioning disk 31. The lugs 30 are laterally drilled in adaptation to the arresting leg 19. If the locking pieces or closure pieces 29 are inserted into the longitudinal segments 23, 24, the arresting leg 19 may be introduced into the lateral bores 20, in the bolts 10b, as well as into the lateral bores 32, in the lugs 30, so that then the closure or locking pieces 29, the longitudinal segments 23, 24 and the deformation members 18 constitute a single unit which may be inserted into the sleeve 14a. A dowel pin 34 may then be introduced, through a bore 33, provided centrally in the sleeve 14a, and through the bore 26, in the plug-in pin 25, as well as the bore 27 in the end segment 28 of the longitudinal segment 24 and, in this manner, the longitudinal segments 23, 24 and the sleeve 14a may be connected with one another. The operational position of the energy converter 2b is then assured by the positioning disks 31, which come to rest externally against the wall 6 of the belt fitting 1.

Figure 4:
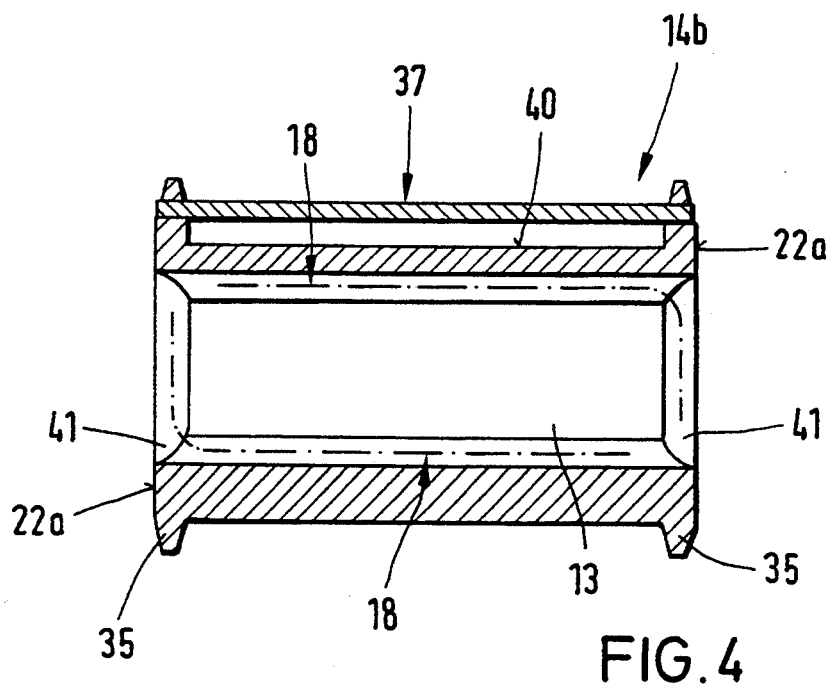
FIG. 4 illustrates a sleeve for an energy converter, according to the embodiment of FIGS. 1 to 3, shown in a vertical longitudinal section.
Figure 5:
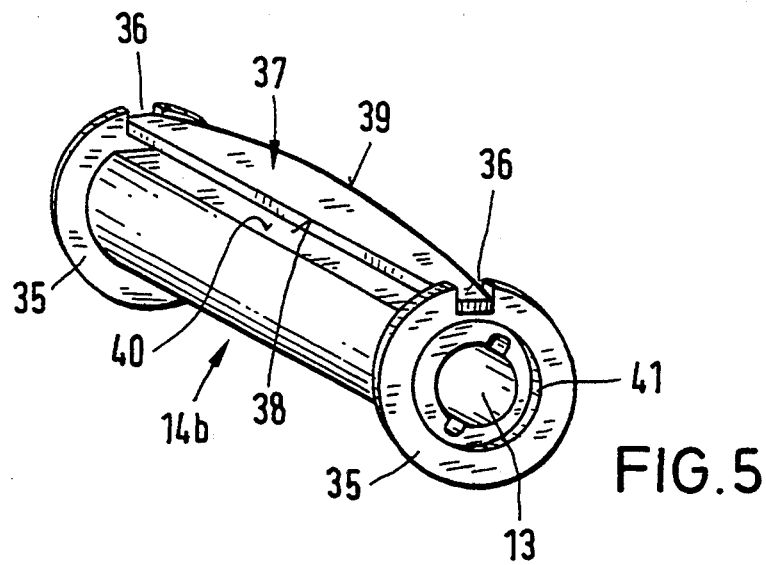
FIG. 5 illustrates a perspective view of the sleeve of FIG. 4.

FIGS. 4 and 5 illustrate a variation of the sleeve 14b. The sleeve 14b of FIGS. 4 and 5 is provided with two circumferential annular collars 35 on the end faces. The annular collars 35 have recesses 36 lying axially opposite one another. The cutouts 36 serve for fixing or retaining a strip-like driver 37, which, on one longitudinal side 39, is in a straight line while, on the opposite longitudinal side 39, is curved in a convex manner. Beneath the driver 37, the sleeve 14b has a flattening 40. The spacing between the flattening 40 and the driver 37 corresponds approximately to the thickness of one belt band 15.

In addition, FIGS. 4 and 5 illustrate that the sleeve 14b has two recesses 41 on the end faces, which are matched to the configuration of an arresting leg 19 of a deformation member 18 according to FIGS. 1 to 3.

In this embodiment, the end faces 22a of the sleeves 14b are located directly next to the cheek 6 of a belt fitting 1, according to FIG. 3, while the arresting legs 19 lie in the end side recesses 41 of the sleeves 14b. The deformation members 18 are shown in FIG. 4 merely by their central axes outlined by broken dotted lines.

The fastening of the belt band 15 in a sleeve 14b, according to FIGS. 4 and 5, and the functioning of the system may be easily explained with reference to FIGS.

6 to 8. Further, it may be seen, that a sleeve 14c, shown in cross-section in FIG. 6, which apart from the inner longitudinal groove 16, as well as the outer flattening 14 beneath the driver 17, comprises additional longitudinal grooves 42, which are located at the outer circumference for reasons of weight reduction. Such a sleeve 14c may therefore be manufactured from an extrusion semi-finished material.

Figure 6:
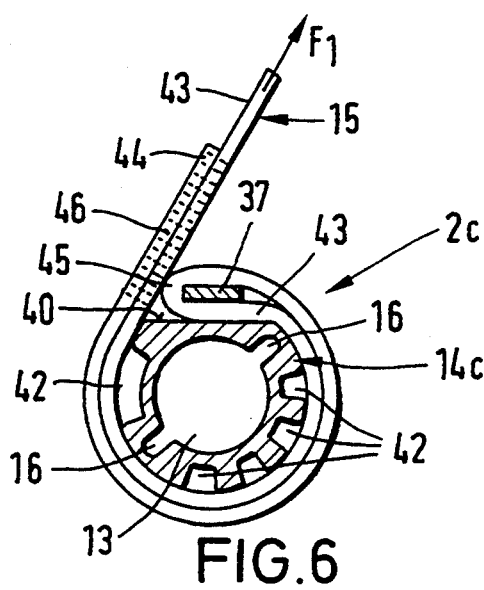
FIG. 6 illustrates a cross-sectional view, through a sleeve, which is similar to the sleeve of FIGS. 4 and 5 with the belt band installed and in a readiness state.
Figure 7:
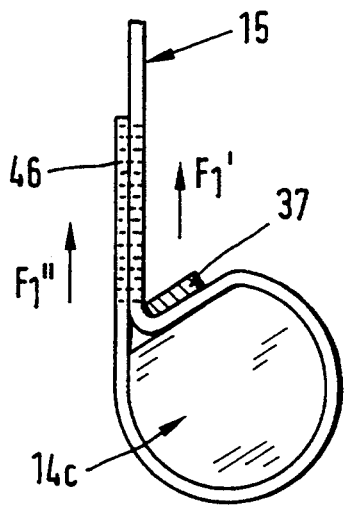
FIG. 7 illustrates the illustration of FIG. 6 during application of tension to the belt band.
Figure 8:
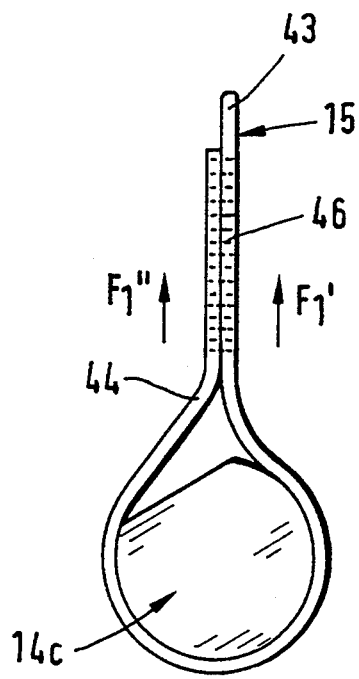
FIG. 8 illustrates the illustration of FIG. 6 at the termination of the application of tension.

The sleeve 14c is outlined diagrammatically in FIGS. 7 and 8. As can be seen in FIG. 6, the belt band 15 is placed with its two strands 43, 44 around the sleeve 14c in a totally embracing manner. Herein, the load-carrying strand 43 runs through a gap between the driver 37 and the flattening 40. The two strands 43, 44 are connected with one another by a seam 46 of a predetermined spacing from the wraparound region 45.

If a sufficiently high force F1 is applied to the belt band 15, the sleeve 14c is turned relative to the bolt 10, 10a, 10b, (not shown) by force application to the driver 37, and to such an extent until the force F1 subdivides into two similarly high partial forces F1' and F1" as illustrated in FIG. 8. The desired energy conversion is achieved in this phase and the entire energy converter 2c must satisfy the ultimate load demanded from it.

Since the definitive attachment of the belt band 15 to the driver 37 is not sensible due to weight considerations, it is advantageous to transmit the desired ultimate embracing roll through the belt band 15, directly over the sleeve 14c, to the bolt 10, 10a, 10b, which is connected with the belt fitting 1. The driver 37 is therefore sized so that the partial force F1' bends said driver 37 in a direction of the partial force F1' in the position of the sleeve 14c, illustrated in FIG. 7 and, thus, turns it out of the recesses 36 (not shown). Afterwards, the force F1 is introduced into the sleeve 14c, symmetrically over the two strands 43, 44, as a resultant from both partial forces F1' and F1", into in the sleeve 14c, as illustrated in FIG. 8.

FIG. 9 illustrates an energy converter 2d having a deformation member 18a which is manufactured from flat stock, and whose security against turning is assured by having its being secured at a cheek 6a of a belt fitting 1a instead of at the bolt 10c. For this purpose, a deformation member 18a is curved in an S-shaped fashion as far as its arresting leg 19a is concerned. The arresting leg 19a is hung positively and frictionally locked into a recess 47 in the cheek 6a on the circumference of a bore 7a for the bolt 10c. Subsequently, the bolt 10c is slid into the bore 7a and secured in position. In this manner, the deformation member 18a is attached or fastened in a lasting fashion.

If such a deformation member 18a is utilized, the longitudinal groove 16, in a sleeve 14, 14a–c, is adapted or matched to the cross-section of the sleeve leg 17a of the deformation member 18a.

FIG. 10 illustrates an advantageous utilization of the energy converter 2 in an automatic roll-up device 48. In FIG. 10, a blocking or latching wheel 49, having a set of teeth 50, projecting on its circumference, is fastened on one or both sides on the bolt 10, into which teeth 50 engages a locking or rachet-pawl 51, in case of a locking or latching process, which prevents an additional reeling-off of the belt band 15. The bolt 10 is introduced into a sleeve 14 and is secured against turning by a deformation member 18, as illustrated in FIG. 1.

If the bolt 10 is prevented from turning further through the engagement of the ratchet pawl 51, into the set of teeth 50, of the latching wheel 49, then the sleeve 14 will be inclined to turn, at the belt band 15, with respect to the bolt 10 when a specific force F2 is exceeded and coils therein the arresting leg 19 due to the shortening of the sleeve legs 17 around the shank of the bolt 10.

While the present invention has been described in various preferred embodiments, such descriptions are meant to be merely illustrative of the present invention and are not to be construed as limitations thereof. Therefore, the present invention may encompass any and all modifications and/or alternate embodiments with the scope of the present invention limited only by the claims which follow.

We claim:

1. An energy converter for a safety belt, the energy converter comprising a sleeve having an interior defined by an interior surface, a belt band of the safety belt being attached to the sleeve, a bolt having a bolt shank extending into the interior of the sleeve, the bolt having an end mounted so as to be non-rotatable in a stationarily attached belt fitting, at least one deformation member comprising a wire section having a sleeve leg and an arresting leg, the sleeve leg and the arresting leg extending at angle relative to each other, the sleeve having an end face, the arresting leg being fixedly attached to the bolt shank at the end face of the sleeve, the bolt shank having an axis, the interior surface of the sleeve defining a groove extending in an axial direction, the sleeve leg extending in the axial direction and being slidably supported in the groove of the sleeve, wherein the groove has a cross-section which coincides with the cross-section of the sleeve leg, and wherein the arresting leg contacts the bolt shank.

2. The energy converter of claim 1, wherein at least two deformation members having sleeve legs, which are offset from each other through 180°, are provided on a circumference of said bolt shank and are fixed in position with their arresting legs respectively in said bolt shank at said end face of said sleeve.

3. The energy converter of claim 2, wherein said bolt further comprises:
a plurality of longitudinal segments which are non-rotationally pinned together, wherein each arresting leg of said deformation members is fixed in position in each of said longitudinal segments.

4. The energy converter of claim 2, wherein said arresting leg of said deformation member, which has a rectangular cross-section, is bent in an S-shaped manner and is fixed in position in a recess in said belt fitting on a circumference of a receiving bore of said bolt.

5. The energy converter of claim 1, wherein said arresting leg of said deformation member is fitted into a radially lateral bore of said bolt shank.

6. The energy converter of claim 1, wherein a transition of said groove, in regions of an end face of said sleeve which adjoins a mouth of said sleeve interior, is rounded to match a cross-section of said deformation member.

7. The energy converter of claim 1, wherein said sleeve has a recess in said end face, in a plane of said arresting leg which extends laterally to said axis of said bolt.

8. The energy converter of claim 1, wherein said arresting leg secures a closure piece having a positioning disk and a leg to an end face of said bolt, wherein said leg is inserted into said end face of said bolt.

9. The energy converter of claim 1, wherein said arresting leg of said deformation member, which has a rectangular cross-section, is bent in an S-shaped manner and is fixed in position in a recess in said belt fitting on a circumference of a receiving bore of said bolt.

10. The energy converter of claim 1, wherein said bolt has a longitudinal channel.

11. The energy converter of claim 1, wherein said sleeve has an annular collar on each end face.

12. The energy converter of claim 11, further comprising:
    a driver around which said belt band the driver wrapped, is being fixed in said annular collars.

13. The energy converter of claim 12, wherein said driver has a convex end face extending between said annular collars in a direction perpendicular to the sleeve axis.

14. The energy converter of claim 12, wherein said sleeve is flattened beneath said driver.

15. The energy converter of claim 1, wherein said sleeve has longitudinal grooves at an external circumference.

16. The energy converter of claim 1, further comprising:
    an automatic belt roll-up device, wherein said bolt is a component of said device and wherein said bolt is connected at least on one end face with a toothed blocking wheel which cooperates with a locking pawl.

* * * * *